(12) United States Patent
Watanabe

(10) Patent No.: US 9,948,388 B2
(45) Date of Patent: Apr. 17, 2018

(54) NETWORK MANAGEMENT DEVICE AND NETWORK MANAGEMENT SYSTEM

(71) Applicant: FUJITSU LIMITED, Kawasaki-shi, Kanagawa (JP)

(72) Inventor: Rikiya Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/288,180

(22) Filed: Oct. 7, 2016

(65) Prior Publication Data
US 2017/0155446 A1 Jun. 1, 2017

(30) Foreign Application Priority Data
Nov. 30, 2015 (JP) .................................. 2015-233268

(51) Int. Cl.
H04B 10/079 (2013.01)
H04J 14/02 (2006.01)
H04Q 11/00 (2006.01)

(52) U.S. Cl.
CPC .... H04B 10/07953 (2013.01); H04J 14/0227 (2013.01); H04J 14/0271 (2013.01); H04Q 11/0066 (2013.01); *H04Q 2011/0083* (2013.01)

(58) Field of Classification Search
None
See application file for complete search history.

(56) References Cited

U.S. PATENT DOCUMENTS

| 6,466,348 B1 | 10/2002 | Izumi |
| 2005/0207754 A1 | 9/2005 | Yamaguchi et al. |
| 2008/0219664 A1* | 9/2008 | Zaacks .............. H04J 14/0227 398/58 |
| 2009/0092395 A1* | 4/2009 | Vassilieva ............ H04B 10/505 398/79 |
| 2010/0189445 A1* | 7/2010 | Nakashima ............ H04B 10/60 398/152 |
| 2011/0020010 A1* | 1/2011 | Bruno ................ H04B 10/2942 398/158 |
| 2011/0188851 A1* | 8/2011 | Oda ....................... H04J 14/021 398/26 |
| 2012/0224851 A1* | 9/2012 | Takara ............... H04B 10/0793 398/45 |

FOREIGN PATENT DOCUMENTS

| JP | 11-261490 | 9/1999 |
| JP | 2004-173309 | 6/2004 |
| JP | 2005-269007 | 9/2005 |

* cited by examiner

Primary Examiner — Darren E Wolf
(74) Attorney, Agent, or Firm — Staas & Halsey LLP

(57) ABSTRACT

There is provided a network management device to manage a network on which an existing optical path is operated, the network management device including: a first receiver configured to receive data related to a measurement result of signal quality of a first optical signal having a first wavelength on the existing optical path; a second receiver configured to receive a request for adding a second optical signal having a second wavelength to the existing optical path; at least one memory configured to store a procedure; and at least one processor configured to execute the procedure of estimating a variation quantity in the signal quality of the first optical signal when the second optical signal is added to the existing optical path based on the data related to the measurement result, when the request is received, and determining whether to add the second optical signal based on results of the estimating.

6 Claims, 16 Drawing Sheets

| λ [mm] \ OPTICAL PATH (START POINT~ END POINT, INCLUDING PATH) | NE1~ NE2 | NE1~ NE2~ NE3 | NE1~ NE2~ NE3~ NE4 | ... | NE2~ NE3~ NE4 | ... | NE1~ NE5~ NE4~ NE3 |
|---|---|---|---|---|---|---|---|
| λ#1 | 12.7 | 9.7 | 7.9 | ... | 9.7 | ... | 7.9 |
| λ#2 | 12.8 | 9.8 | 8.0 | ... | 9.8 | ... | 8.0 |
| λ#3 | 12.9 | 9.9 | 8.1 | ... | 9.9 | ... | 8.1 |
| λ#4 | 13.0 | 10.0 | 8.2 | ... | 10.0 | ... | 8.2 |

| $\lambda_{exp}$ [nm] \ $\lambda_{Add}$ [nm] | λ#1 | λ#2 | λ#3 | λ#4 | 0 (NO ADDED WAVE-LENGTH) |
|---|---|---|---|---|---|
| λ#1 | #N/A | 0.3 | 0.2 | 0.1 | 0.0 |
| λ#2 | 0.3 | #N/A | 0.3 | 0.2 | 0.0 |
| λ#3 | 0.2 | 0.3 | #N/A | 0.3 | 0.0 |
| λ#4 | 0.1 | 0.2 | 0.3 | #N/A | 0.0 |

302b

| $\lambda_{exp}$ [nm] \ $\lambda_{Add}$ [nm] | λ#1 | λ#2 | λ#3 | λ#4 | 0 (NO ADDED WAVE-LENGTH) |
|---|---|---|---|---|---|
| λ#1 | #N/A | 0.5 | 0.4 | 0.3 | 0.2 |
| λ#2 | 0.5 | #N/A | 0.5 | 0.4 | 0.2 |
| λ#3 | 0.4 | 0.5 | #N/A | 0.5 | 0.2 |
| λ#4 | 0.3 | 0.4 | 0.5 | #N/A | 0.2 |

| $\lambda_{exp}$ [nm] \ $\lambda_{Add}$ [nm] | λ#1 | λ#2 | λ#3 | λ#4 | 0 (NO ADDED WAVE-LENGTH) |
|---|---|---|---|---|---|
| λ#1 | #N/A | 0.1 | 0.2 | 0.3 | 0.0 |
| λ#2 | 0.0 | #N/A | 0.1 | 0.2 | 0.0 |
| λ#3 | 0.0 | 0.0 | #N/A | 0.1 | 0.0 |
| λ#4 | 0.0 | 0.0 | 0.0 | #N/A | 0.0 |

303b

| $\lambda_{exp}$ [nm] \ $\lambda_{Add}$ [nm] | λ#1 | λ#2 | λ#3 | λ#4 | 0 (NO ADDED WAVE-LENGTH) |
|---|---|---|---|---|---|
| λ#1 | #N/A | 0.1 | 0.2 | 0.3 | 0.0 |
| λ#2 | 0.0 | #N/A | 0.1 | 0.2 | 0.0 |
| λ#3 | 0.0 | 0.0 | #N/A | 0.1 | 0.0 |
| λ#4 | 0.0 | 0.0 | 0.0 | #N/A | 0.0 |

| $\lambda_{exp}$ [nm] \ $\lambda_{Add}$ [nm] | λ#1 | λ#2 | λ#3 | λ#4 | 0 (NO ADDED WAVE-LENGTH) |
|---|---|---|---|---|---|
| λ#1 | #N/A | 0.1 | 0.2 | 0.3 | 0.0 |
| λ#2 | 0.0 | #N/A | 0.1 | 0.2 | 0.0 |
| λ#3 | 0.0 | 0.0 | #N/A | 0.1 | 0.0 |
| λ#4 | 0.0 | 0.0 | 0.0 | #N/A | 0.0 |

FIG.8

| OPTICAL PATH (START POINT~ END POINT, INCLUDING PATH) / λ [mm] | NE1~NE2 | NE1~NE2~NE3 | NE1~NE2~NE3~NE4 | ... | NE2~NE3~NE4 | ... | NE1~NE5~NE4~NE3 |
|---|---|---|---|---|---|---|---|
| λ#1 | 12.7 | 9.7 | 7.9→7.7 (ESTIMATION RESULT IS 7.1) | ... | 9.7 | ... | 7.9 |
| λ#2 | 12.8 | 9.8→9.2 (ESTIMATION RESULT IS 8.6) | 8.0 | ... | 9.8 | ... | 8.0 |
| λ#3 | 12.9 | 9.9 | 8.1 | ... | 9.9→9.8 (ESTIMATION RESULT IS 9.6) | ... | 8.1 |
| λ#4 | 13.0 | 10.0 | 8.2 | ... | 10.0 | ... | 8.2 |

| $\lambda_{exp}$ [nm] \ $\lambda_{Add}$ [nm] | λ#1 | λ#2 | λ#3 | λ#4 | 0 (NO ADDED WAVE-LENGTH) |
|---|---|---|---|---|---|
| λ#1 | #N/A | 0.3×(9.9-9.8)/(9.9-9.6)=0.1 | 0.2 | 0.1 | 0.0 |
| λ#2 | 0.3 | #N/A | 0.3×(9.8-9.2)/(9.8-8.6)=0.15 | 0.2×(9.8-9.2)/(9.8-8.6)=0.1 | 0.0 |
| λ#3 | 0.2 | 0.3×(9.9-9.8)/(9.9-9.6)=0.1 | #N/A | 0.3 | 0.0 |
| λ#4 | 0.1 | 0.2 | 0.3 | #N/A | 0.0 |

602b

| $\lambda_{exp}$ [nm] \ $\lambda_{Add}$ [nm] | λ#1 | λ#2 | λ#3 | λ#4 | 0 (NO ADDED WAVE-LENGTH) |
|---|---|---|---|---|---|
| λ#1 | #N/A | 0.5 | 0.4 | 0.3 | 0.2 |
| λ#2 | 0.5 | #N/A | 0.5 | 0.4×(9.8-9.2)/(9.8-8.6)=0.2 | 0.2 |
| λ#3 | 0.4 | 0.5 | #N/A | 0.5 | 0.2 |
| λ#4 | 0.3 | 0.4 | 0.5 | #N/A | 0.2 |

| $\lambda_{Add}$ [nm] / $\lambda_{exp}$ [nm] | λ#1 | λ#2 | λ#3 | λ#4 | 0 (NO ADDED WAVE-LENGTH) |
|---|---|---|---|---|---|
| λ#1 | #N/A | 0.6×(7.9-7.7)/(7.9-7.1)=0.15 | 0.5 | 0.4 | 0.3 |
| λ#2 | 0.6 | #N/A | 0.6 | 0.5 | 0.3 |
| λ#3 | 0.5 | 0.6 | #N/A | 0.6 | 0.3 |
| λ#4 | 0.4 | 0.5 | 0.6 | #N/A | 0.3 |

| $\lambda_{exp}$ [nm] \ $\lambda_{Add}$ [nm] | λ#1 | λ#2 | λ#3 | λ#4 | 0 (NO ADDED WAVE-LENGTH) |
|---|---|---|---|---|---|
| λ#1 | #N/A | 0.1×(7.9-7.7)/(7.9-7.1)=0.013 | 0.2 | 0.3 | 0.0 |
| λ#2 | 0.0 | #N/A | 0.1 | 0.2 | 0.0 |
| λ#3 | 0.0 | 0.0 | #N/A | 0.1 | 0.0 |
| λ#4 | 0.0 | 0.0 | 0.0 | #N/A | 0.0 |

603b

| $\lambda_{exp}$ [nm] \ $\lambda_{Add}$ [nm] | λ#1 | λ#2 | λ#3 | λ#4 | 0 (NO ADDED WAVE-LENGTH) |
|---|---|---|---|---|---|
| λ#1 | #N/A | 0.1×(7.9-7.7)/(7.9-7.1)=0.013 | 0.2 | 0.3 | 0.0 |
| λ#2 | 0.0 | #N/A | 0.1×(9.8-9.2)/(9.8-8.6)=0.05 | 0.2 | 0.0 |
| λ#3 | 0.0 | 0.0×(9.9-9.8)/(9.9-9.6)=0.0 | #N/A | 0.1 | 0.0 |
| λ#4 | 0.0 | 0.0 | 0.0 | #N/A | 0.0 |

NETWORK MANAGEMENT DEVICE AND NETWORK MANAGEMENT SYSTEM

CROSS-REFERENCE TO RELATED APPLICATION

This application is based upon and claims the benefit of priority of the prior Japanese Patent Application No. 2015-233268, filed on Nov. 30, 2015, the entire contents of which are incorporated herein by reference.

FIELD

The embodiments discussed herein are related to an optical communication device and system for network management.

BACKGROUND

In a wavelength division multiplexing (WDM) network, a wavelength may be newly added in some cases. When a new wavelength is added to an existing optical path, it is determined whether a design value of transmission quality in the existing optical path reaches a required value of transmission quality required when the new wavelength is added. For example, the worst value of a parameter for determining transmission quality such as an optical fiber or an optical component is used as the design value.

When it is determined that the design value of the transmission quality in the existing optical path reaches the required value of the transmission quality, the new wavelength may be added to the existing optical path. On the other hand, when it is determined that the design value of the transmission quality in the existing optical path does not reach the required value of the transmission quality, the transmission quality is ensured by disposing a regenerator (REG) (a regenerative repeater) in the existing optical path in order to add the new wavelength.

In the WDM network, a light wavelength separating device separates a wavelength A in which a monitoring control signal is carried, and applies the separated monitoring control signal to a monitoring control signal transmission/reception circuit. A technique is known in which an AGC circuit controls an amplifier on the basis of an output of the monitoring control signal transmission/reception circuit and an output of a monitor so as to make a gain of an optical amplifier constant (see, e.g., Japanese Laid-Open Patent Publication No. 2004-173309).

Related technologies are disclosed in, for example, Japanese Laid-Open Patent Publication No. 2004-173309.

SUMMARY

According to an aspect of the invention, a network management device is configured to manage a network on which an existing optical path is operated, the network management device includes: a first receiver configured to receive data related to a measurement result of signal quality of a first optical signal having a first wavelength on the existing optical path; a second receiver configured to receive a request for adding a second optical signal having a second wavelength to the existing optical path; at least one memory configured to store a procedure; and at least one processor configured to execute the procedure of estimating a variation quantity in the signal quality of the first optical signal when the second optical signal is added to the existing optical path based on the data related to the measurement result, when the request is received, and determining whether to add the second optical signal based on results of the estimating.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a diagram illustrating an example of transmission quality deterioration quantity information due to a nonlinear penalty according to the embodiment;

FIG. 5A is a diagram illustrating an example of transmission quality deterioration quantity information due to an OSNR deterioration according to the embodiment;

FIG. 5B is a diagram illustrating an example of transmission quality deterioration quantity information due to an OSNR deterioration according to the embodiment;

FIG. 8 is a diagram illustrating an example of updated transmission quality information;

FIG. 9A is a diagram illustrating an example of updated transmission quality deterioration quantity information due to a nonlinear penalty;

FIG. 10A is a diagram illustrating an example of updated transmission quality deterioration quantity information due to an OSNR deterioration;

DESCRIPTION OF EMBODIMENTS

For example, a design value ($Q_{wst}$) of transmission quality in an existing optical path is set to 5.5 dB. A required value ($Q_{req}$) of transmission quality which is required for an existing optical path when adding a new wavelength to the existing optical path is set to 7.0 dB. In this environment, the design value ($Q_{wst}$) of transmission quality does not reach the required value ($Q_{req}$) of transmission quality. Accordingly, an REG is disposed in the existing optical path so as to ensure transmission quality and enable the addition of a new wavelength.

By the way, various units constituting a network have individual differences and actual transmission quality is different from the design value. For example, it is assumed that a noise figure (NF) value of an optical amplifier disposed in an existing optical path is 2.0 dB better than the design value. Then, the transmission quality in the existing optical path is actually 7.5 dB. Since the actual transmission quality in the existing optical path reaches the required value ($Q_{req}$) of transmission quality, a new optical path may be added without disposing the REG.

In this case, when a network is designed using the design value ($Q_{wst}$) of transmission quality, an unnecessary REG is disposed in order to newly add an optical path, and thus, network costs increase.

Hereinafter, an embodiment that enables a network design that is more efficient than a network design using a design value will be described with reference to the accompanying drawings.

Figure 1:
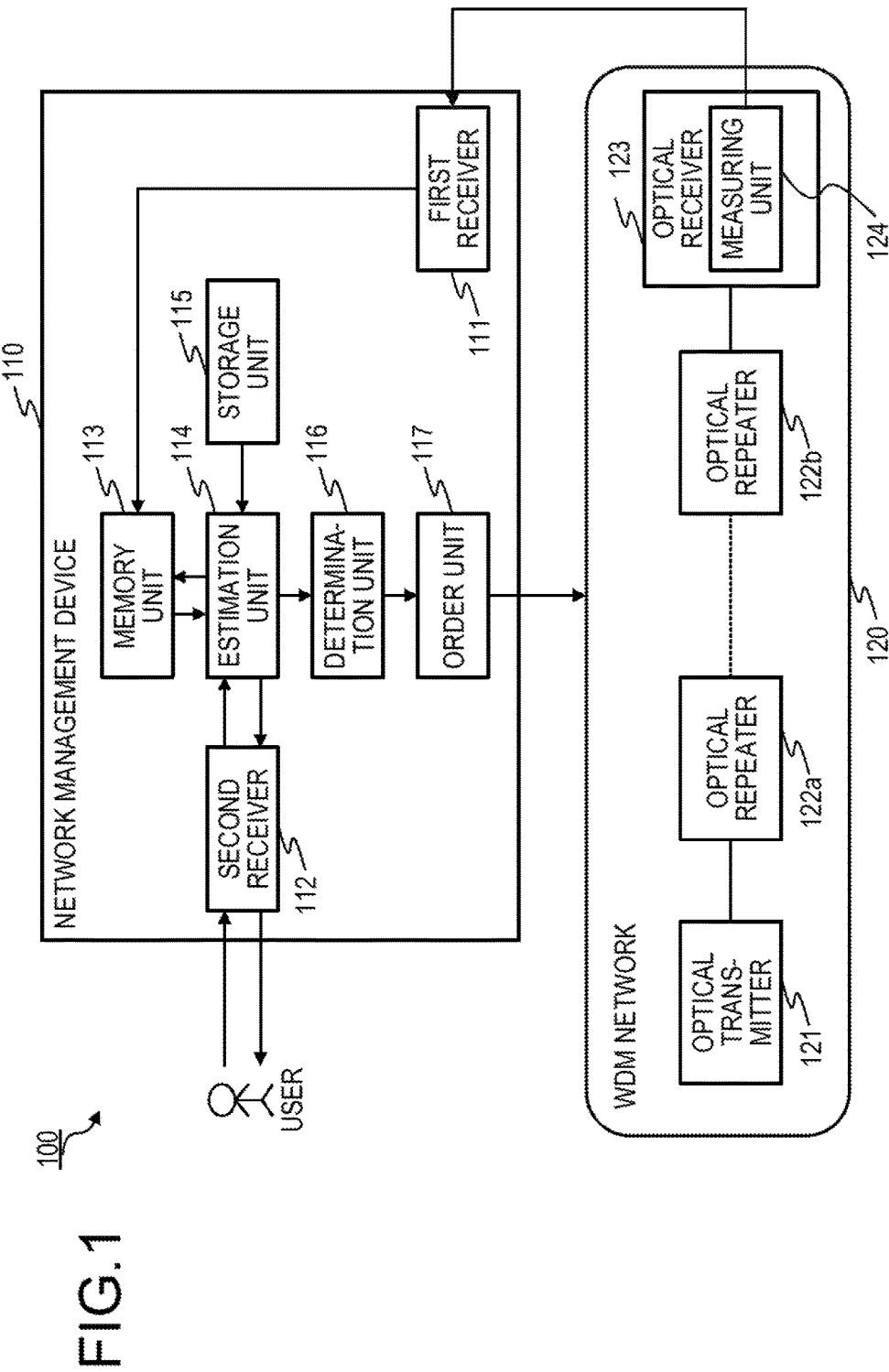
FIG. 1 is a diagram illustrating an example of a network management system according to an embodiment.

A network management device according to the present disclosure may estimate whether a new wavelength is addable on the basis of a measured value of transmission quality during the operation of an existing optical path. FIG. 1 is a diagram illustrating an example of a network management system according to the present embodiment. The network management system 100 includes a network management device 110 and a WDM network 120 to be managed by the network management device 110. The WDM network 120 includes an optical transmitter 121, optical repeaters 122a and 122b, and an optical receiver 123. An optical signal transmitted from the optical transmitter 121 is relayed by the optical repeaters 122a and 122b and is received by the optical receiver 123. The optical receiver 123 includes a measuring unit 124. The measuring unit 124 measures transmission quality of an optical path between the optical transmitter 121 and the optical receiver 123. The WDM network 120 may have a constitution of an Add/Drop network, a mesh structure, or the like.

The network management device 110 is a device that manages the WDM network 120. The network management device 110 includes a first receiver 111, a second receiver 112, a memory unit 113, an estimation unit 114, a storage unit 115, a determination unit 116, and an order unit 117. The first receiver 111 has an interface that receives a measurement result of the measuring unit 124. The second receiver 112 receives a request for adding an optical path. Hereinafter, an optical path to be added means that a wavelength is newly added, but may include a path passing through a section (span) that is partially different from an existing optical path. For example, the request for adding an optical path is input by a user. The memory unit 113 stores transmission quality information (which will be described later with reference to FIG. 3), transmission quality deterioration quantity information due to a nonlinear penalty (which will be described later with reference to FIGS. 4A and 4B), and transmission quality deterioration quantity information due to an optical signal-to-noise ratio (OSNR) deterioration (which will be described later with reference to FIGS. 5A and 5B). When the measurement result is acquired from the first receiver 111, the memory unit 113 stores the transmission quality information, the transmission quality deterioration quantity information due to a nonlinear penalty, and the transmission quality deterioration quantity information due to an OSNR deterioration which are updated on the basis of the measurement result.

The determination unit 116 determines whether a new optical path is addable on the basis of the transmission quality information. The storage unit 115 stores user policy information which is used for the determination unit 116 to determine whether a new optical path is addable. When the determination unit 116 determines that an optical path is addable, the order unit 117 transmits a network setting order to set an optical path to the WDM network 120.

The transmission quality information includes path information from a certain node element (NE) to another NE and a value indicating the latest (current) transmission quality ($Q_{cur}$) correlated with each wavelength. The memory unit 113 stores the transmission quality information for each optical path. When an optical path is added for the first time, the memory unit 113 stores a design value of transmission quality in the transmission quality information. Thereafter, whenever an optical path is added, the memory unit 113 stores the transmission quality information which is updated by the estimation unit 114 on the basis of the measurement result.

The estimation unit 114 acquires information relating to an optical path to be newly added from the second receiver. The estimation unit 114 estimates a transmission quality deterioration quantity due to a nonlinear penalty ($\Delta Q_{penalty}$) and a transmission quality deterioration quantity due to an OSNR deterioration ($\Delta Q_{OSNR}$) on the basis of the transmission quality information.

The transmission quality deterioration quantity information due to a nonlinear penalty indicates the transmission quality deterioration quantity due to a nonlinear penalty ($\Delta Q_{penalty}$) for each section (span) when adding an optical path. The transmission quality deterioration quantity information due to a nonlinear penalty includes a transmission quality deterioration quantity ($\Delta Q_{penalty}$) corresponding to a wavelength ($\lambda_{exp}$) of an optical path to be calculated and a wavelength ($\lambda_{add}$) of an added optical path. The transmission quality deterioration quantity ($\Delta Q_{penalty}$) is estimated by the estimation unit 114. The memory unit 113 stores the transmission quality deterioration quantity information due to a nonlinear penalty for each fiber input level, each fiber type, and each transmission quality deterioration quantity up to the previous section. The memory unit 113 stores the design value as the transmission quality deterioration quantity information due to a nonlinear penalty until a second optical path is added. Thereafter, whenever an optical path is added, the memory unit 113 stores the transmission quality deterioration quantity information due to a nonlinear penalty which is updated on the basis of the estimation result of the estimation unit 114.

The transmission quality deterioration quantity information due to an OSNR deterioration indicates the transmission quality deterioration quantity due to an OSNR deterioration ($\Delta Q_{OSNR}$) for each span when adding an optical path. The transmission quality deterioration quantity information due to an OSNR deterioration includes a transmission quality deterioration quantity ($\Delta Q_{OSNR}$) corresponding to a wavelength ($\lambda_{exp}$) of an optical path to be calculated and a wavelength ($\lambda_{add}$) of an added optical path. The transmission quality deterioration quantity ($\Delta Q_{OSNR}$) is estimated by the estimation unit 114. The memory unit 113 stores the transmission quality deterioration quantity information due to an OSNR deterioration for each fiber input level, each wavelength number, and each fiber type. The memory unit 113 stores the design value as the transmission quality deterioration quantity information due to an OSNR deterioration until a second optical path is added. Thereafter, whenever an optical path is added, the memory unit 113 stores the transmission quality deterioration quantity information due to an OSNR deterioration which is updated on the basis of the estimation result of the estimation unit 114.

Hereinafter, an operation flow of the network management device 110 will be described in sequence.

(1) When no optical path is present in a network, the design value is set in the transmission quality information, the transmission quality deterioration quantity information due to a nonlinear penalty, and the transmission quality deterioration quantity information due to an OSNR deterioration which are stored in the memory unit 113.

(2) The user inputs information related to an NE of a start point, an NE of an end point, and communication capability of an optical path to be added to the network management device 110. The second receiver 112 receives the input information.

(3) The estimation unit 114 estimates a transmission quality deterioration quantity due to a nonlinear penalty ($\Delta Q_{penalty}$) and a transmission quality deterioration quantity due to an OSNR deterioration ($\Delta Q_{OSNR}$) which has an influence on an existing optical path by adding an optical path on the basis of the transmission quality information.

(4) The determination unit 116 determines whether a value obtained by subtracting a transmission quality deterioration quantity ($Q_{add}$) due to the addition of an optical path from the current transmission quality ($Q_{cur}$) greater than required transmission equality ($Q_{req}$). When the value obtained by subtracting a transmission quality deterioration quantity ($Q_{add}$) due to the addition of an optical path from the current transmission quality ($Q_{cur}$) is greater than the required transmission equality ($Q^{req}$), the determination unit 116 determines that the addition of the optical path is enabled. When the value obtained by subtracting a transmission quality deterioration quantity ($Q_{add}$) due to the addition of an optical path from the current transmission quality ($Q_{cur}$) less than the required transmission equality ($Q_{req}$), the determination unit 116 determines that the addition of the optical path is disabled.

Here, the transmission quality deterioration quantity ($Q_{add}$) due to the addition of an optical path is a total sum of estimated values of a transmission quality variation which is estimated when adding a wavelength in an optical path to be added. The transmission quality deterioration quantity ($Q_{add}$) due to the addition of an optical path is a sum of the transmission quality deterioration quantity due to a nonlinear penalty ($\Delta Q_{penalty}$) and the transmission quality deterioration quantity due to an OSNR deterioration ($\Delta Q_{OSNR}$) which correspond to the added optical path, which are estimated by the estimation unit 114. The desired transmission quality ($Q_{req}$) is a desired value of transmission quality to be secured when adding an optical path and is a value which can be selected from the user policy information stored in the storage unit 115. The user arbitrarily selects a desired transmission quality ($Q_{req}$) on the basis of a required Pre forward error correction (FEC) bit error rate (BER), an idea of a margin, or the like of the user policy.

(5-1) When it has already been determined that the addition of plural optical paths is enabled, the determination unit 116 prioritizes the optical paths determined to be addable. A higher priority order is given to an optical path which satisfies the input communication capability and has a smaller number of spans in a path connecting an NE of a start point and an NE of an end point. When there are addable optical paths having the same number of spans, a higher priority order is given to an optical path having a shorter wavelength. The method of prioritizing the optical paths using the number of spans and the wavelength is merely an example and the priority order may be set using another method.

(5-2) The determination unit 116 selects one optical path from the highest priority order side.

(6) The determination unit 116 estimates an influence on an existing optical path when the optical path determined to be addable in the process (4) or the optical path selected in the process (5-2) is added. The existing optical path to be processed in the process (6) is an optical path passing through a path having one or more spans equal to those of the optical path to be added. The determination unit 116 determines whether a value obtained by subtracting an estimated value ($\Delta Q_{det}$) of a transmission quality variation estimated when adding a wavelength in an optical path to be added from the current transmission quality ($Q_{cur}$) is greater than the desired transmission quality ($Q_{req}$). When the subtraction result value is greater than the desired transmission quality ($Q_{req}$), the determination unit 116 determines that there is no influence on the existing optical path and determines the corresponding optical path as an optical path to be added. On the other hand, when the subtraction result value is less than the desired transmission quality ($Q_{req}$), the determination unit 116 determines the corresponding optical path as a non-addable optical path even if the optical path is determined as an addable one in the process (4).

(7) When a request for adding plural optical paths is input in the process (2), the estimation unit 114 and the determination unit 116 repeat the processes (2) to (6) on all of the plural optical paths.

(8) The order unit 117 transmits an order to add the optical path determined to be an optical path to be added in the process (6) to the NEs. The order unit 117 transmits an order to measure the transmission quality after the addition to the optical receiver 124.

(9) The transmission quality information, the transmission quality deterioration quantity information due to a nonlinear penalty, and the transmission quality deterioration quantity information due to an OSNR deterioration which are stored in the memory unit 113 are updated on the basis of the estimation result of the estimation unit 114.

In this way, the determination unit 116 determines, for each optical path newly added, whether there is no adverse influence on the existing optical path and whether the desired transmission quality can be secured on the basis of the measured value. Accordingly, a network design based on an actual operation is may be made more efficiently than a network design using a design value. The priority orders set in the process (5-1) may be set at the time point where an optical path to be added is input in the process (2).

Figure 2:
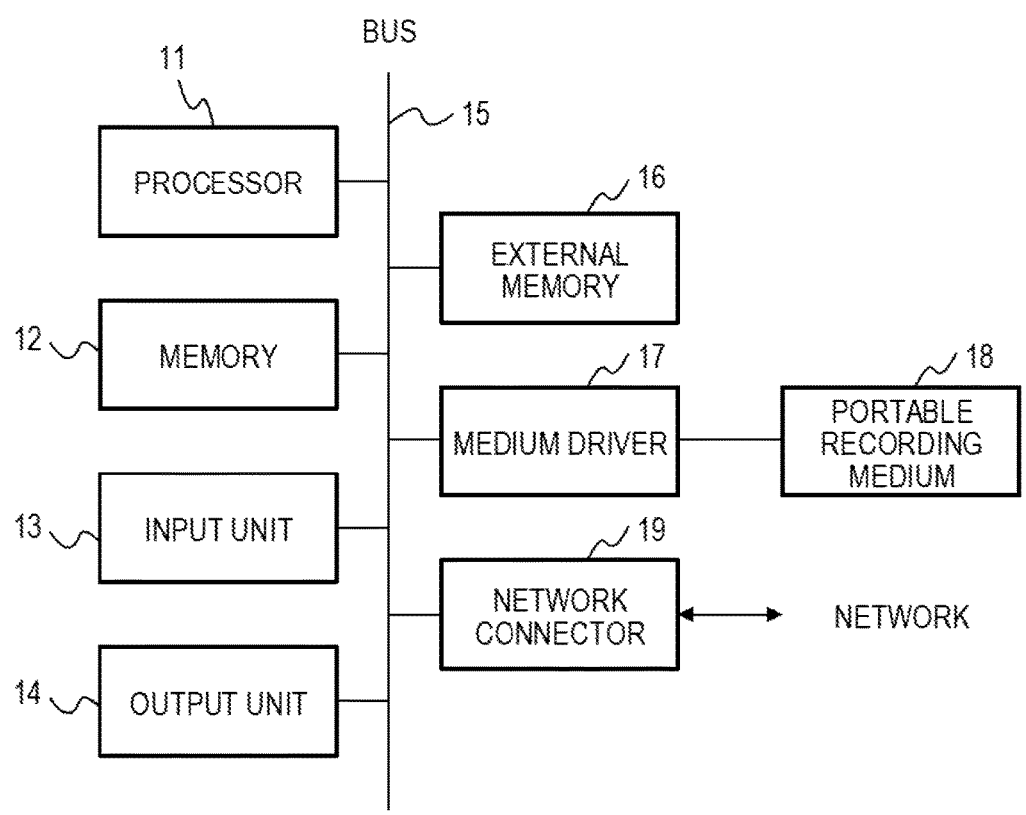
FIG. 2 is a diagram illustrating an example of a hardware configuration of a network management device according to the embodiment.

FIG. 2 is a diagram illustrating an example of a hardware configuration of the network management device according to the present embodiment, the network management device 110 includes a processor 11, a memory 12, a bus 15, an external memory unit 16, and a network connector 19. The network management device 110 may further include an input unit 13, an output unit 14, and a medium driver 17 as options. The network management device 110 may be embodied, for example, by a computer.

The processor 11 functions as the estimation unit 114 and the determination unit 116. The processor 11 may execute a program stored in the external memory 16 via the memory 12. The memory 12 functions as the memory unit 113 and the storage unit 115. The memory 12 also appropriately stores data acquired through the operation of the processor 11 or data used for the process of the processor 11. The network connector 19 is used for communication with another device, and functions as the first receiver 111 and the order unit 117. The network connector 19 is used for communication with another device.

The input unit 13 is implemented by, for example, a button, a keyboard, or a mouse, and the output unit 14 is implemented by a display or the like. The input unit 13 and the output unit 14 function as the second receiver 112. The bus 15 connects the processor 11, the memory 12, the input unit 13, the output unit 14, the external memory 16, the medium driver 17, and the network connector 19 so as to exchange data therebetween. The external memory 16 stores programs, data, and the like, and supplies the programs, the data, and the like to the processor 11 or the like. The external memory 16 is, for example, an externally attached memory. The medium driver 17 may output the data of the memory 12 or the external memory 16 to a portable recording medium 18 and may read programs, data, and the like from the portable recording medium 18. Here, the portable recording medium 18 may employ any portable recording medium such as a flexible disk, a magneto-optical (MO) disk, a compact disc recordable (CD-R), or a digital versatile disk recordable (DVD-R).

Figure 3:
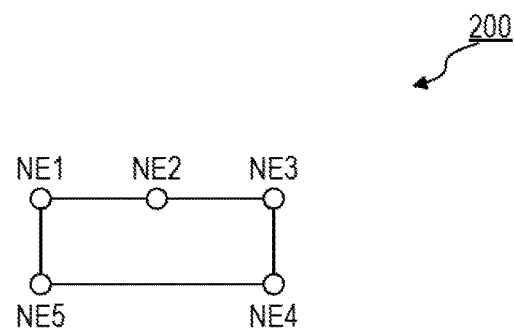
FIG. 3 is a diagram illustrating an example of transmission quality information according to the embodiment.

FIG. 3 is a diagram illustrating an example of the transmission quality information according to the present embodiment. The network 200 is a network including node elements NE1 to NE5. For example, light input from the node element NE1 is transmitted in the ring-shaped network 200 such as NE1~NE2~NE3~NE4~NE5~NE1.

Transmission quality information 301 includes path information corresponding to the network 200 and a value indicating the latest (current) transmission quality ($Q_{cur}$) correlated with each wavelength. The path information indicates a path of a start point a halfway path an end point. For example, a path of NE1~NE5~NE4~NE3 indicates that an optical signal transmitted from NE1 is received by NE3 via NE5 and NE4. The wavelength ($\lambda$) of the transmission quality information 301 is an existing light wavelength. It is assumed that the wavelength of $\lambda$190 1 is the shortest and the wavelength becomes longer in the order of $\lambda\#2$, $\lambda\#3$, and $\lambda\#4$.

For example, in the latest (current) transmission quality ($Q_{cur}$) corresponding to the paths at the wavelength $\lambda\#1$, it can be seen that the transmission quality in three sections of NE1~NE5~NE4~NE3 is deteriorated as compared to the transmission quality in one section of NE1~NE2.

Figure 4B:
FIG. 4B is a diagram illustrating an example of transmission quality deterioration quantity information due to a nonlinear penalty according to the embodiment.

FIGS. 4A and 4B are diagrams illustrating an example of the transmission quality deterioration quantity information due to a nonlinear penalty according to the present embodiment. The transmission quality deterioration quantity information due to a nonlinear penalty, 302a to 302c, indicates a transmission quality deterioration quantity due to a nonlinear penalty ($\Delta Q_{penalty}$) for each span when adding an optical path. The transmission quality deterioration quantity information due to a nonlinear penalty includes the transmission quality deterioration quantity ($\Delta Q_{penalty}$) corresponding to a wavelength of an optical path to be calculated ($\lambda_{exp}$) and a wavelength of an optical path to be added ($\lambda_{add}$). The transmission quality deterioration quantity ($\Delta Q_{penalty}$) is estimated by the estimation unit 114. The memory unit 113 stores the transmission quality deterioration quantity information due to a nonlinear penalty for each fiber input level, each fiber type, and each transmission quality deterioration quantity up to the previous section.

The transmission quality deterioration quantity due to a nonlinear penalty ($\Delta Q_{penalty}$) is an estimated value of a transmission quality variation due to a transmission penalty from the first span to the N-th span. The transmission quality deterioration quantity due to a nonlinear penalty ($\Delta Q_{penalty}$) depends on the fiber type or the fiber input level for each span including the order. Accordingly, the transmission quality deterioration quantity due to a nonlinear penalty ($\Delta Q_{penalty}$) may be calculated by sequentially calculating the sum up to the first span, the sum up to the second span, the sum up to the third span, . . . , the sum up to the (N–1)-th span. A specific method of calculating the transmission quality deterioration quantity due to a nonlinear penalty ($\Delta Q_{penalty}$) in the estimation unit 114 will be described below.

A cumulative total up to the first span: $\Delta Q_{penalty1}=f(\lambda_{exp}, \lambda_{add}, P_{in1}, FiberType_1, 0)$ A cumulative total up to the second span: $\Delta Q_{penalty2}=f(\lambda_{exp}, \lambda_{add}, P_{in2}/FiberType_2, \Delta Q_{penalty1})$ A cumulative total up to the third span: $\Delta Q_{penalty3}=f(\lambda_{exp}, \lambda_{add}, P_{in1}, FiberType_3, \Delta Qpenalty2)$ A cumulative total up to the (N–1)-th span: $\Delta Q_{penalty(N-1)}=f(\lambda_{exp}), \lambda add, P_{in(N-1)}, FiberType_{N-1}, \Delta Q_{penalty(N-2)})$, A cumulative total up to the N-th span: $\Delta Q_{penaltyN}=f(\lambda_{exp}, \lambda add, P_{inN}, FiberType_N, \Delta Q_{penalty(N-1)})$ Here, N denotes the number of spans of an existing optical path of which the variation will be estimated. $P_{in}$ denotes the fiber input power of the X-th span of the existing optical path of which the variation will be estimated. FiberType denotes the fiber type of the X-th span of the existing optical path of which the variation will be estimated. Span X denotes a span among the first to N-th spans.

Finally, the transmission quality deterioration quantity due to a nonlinear penalty ($\Delta Q_{penalty}$) after an optical path is added becomes $\Delta Q_{penaltyN}$.

The transmission quality deterioration quantity information due to a nonlinear penalty 302a is an example in which $P_{in}$ is –2 dBm/ch, the fiber type is a single mode fiber (SMF), and the transmission quality deterioration quantity ($\Delta Q_{penalty}$) up to the previous span is 0.0 dB. The transmission quality deterioration quantity information due to a nonlinear penalty 302a indicates the transmission quality deterioration quantities $\Delta Q_{penaltyN}$ corresponding to the wavelength ($\lambda_{exp}$) of the optical path to be calculated from the first span to the N-th span and the wavelength ($\lambda_{add}$) of the added optical path. Since the transmission quality deterioration quantity $\Delta Q_{penalty}$ up to the previous span is 0.0 dB, there is no influence on the existing optical path and all the transmission quality deterioration quantities $\Delta Q_{penaltyN}$ are 0 when there is no optical path to be added.

The transmission quality deterioration quantity information due to a nonlinear penalty 302b is an example in which Pin is –2 dBm/ch, the fiber type is an SMF, and the transmission quality deterioration quantity ($\Delta Q_{penalty}$) up to the previous span is 0.2 dB. The transmission quality deterioration quantity information due to a nonlinear penalty 302b indicates the transmission quality deterioration quantities $\Delta Q_{penaltyN}$ corresponding to the wavelength ($\lambda_{exp}$) of the optical path to be calculated from the first span to the N-th span and the wavelength ($\lambda_{add}$) of the added optical path. Since the transmission quality deterioration quantity $\Delta Q_{penaltyN}$ up to the previous span is 0.2 dB, all the transmission quality deterioration quantities $\Delta Q_{penaltyN}$ are 0.2 when there is no optical path to be added.

The transmission quality deterioration quantity information due to a nonlinear penalty 302v is an example in which $P_{in}$ is –2 dBm/ch, the fiber type is an SMF, and the transmission quality deterioration quantity ($\Delta Q_{penalty}$) up to the previous span is 0.3 dB. The transmission quality deterioration quantity information due to a nonlinear penalty 302c indicates the transmission quality deterioration quantities $\Delta Q_{penaltyN}$ corresponding to the wavelength ($\lambda_{exp}$) of the optical path to be calculated from the first span to the N-th span and the wavelength ($\lambda_{add}$) of the added optical path. Since the transmission quality deterioration quantity $\Delta Q_{penalty}$ up to the previous span is 0.3 dB, all the transmission quality deterioration quantities $\Delta Q_{penaltyN}$ are 0.3 when there is no optical path to be added.

The transmission quality deterioration quantity information due to each of nonlinear penalties 302a to 302c is an example and is stored in the memory unit 113 for each combination of $P_{in}$, the fiber type, and the transmission quality deterioration quantity ($\Delta Q_{penalty}$) up to the previous span.

FIGS. 5A and 5B are diagrams illustrating an example of the transmission quality deterioration quantity information due to an OSNR deterioration according to the present embodiment. The transmission quality deterioration quantity information due to a nonlinear penalty indicates a transmission quality deterioration quantity due to an OSNR deterioration ($\Delta Q_{OSNR}$) for each span when adding an optical path. The transmission quality deterioration quantity information due to an OSNR deterioration includes the transmission quality deterioration quantity ($\Delta Q_{OSNR}$) corresponding to a wavelength ($\lambda_{exp}$) of an optical path to be calculated and a wavelength ($X_{add}$) of an optical path to be added. The transmission quality deterioration quantity ($\Delta Q_{OSNR}$) is estimated by the estimation unit 114. The memory unit 113 stores the transmission quality deterioration quantity information due to an OSNR deterioration for each fiber input level, and each wavelength number, and each fiber type.

A specific method of calculating the transmission quality deterioration quantity due to an OSNR deterioration ($\Delta Q_{OSNR}$) in the estimation unit 114 will be described below.

$$\Delta Q_{OSNR} = \Delta Q_{OSNR1} + \Delta Q_{OSNR2} + \ldots \Delta Q_{OSNR(N-1)} + \Delta Q_{OSNRN}$$

As indicated, the transmission quality deterioration quantity due to an OSNR deterioration ($\Delta Q_{OSNR}$) is the total value of the transmission quality deterioration quantities $\Delta Q_{OSNR1}$ to $\Delta Q_{OSNRN}$ in the spans. The transmission quality deterioration quantity due to an OSNR deterioration ($\Delta Q_{OSNR}$) may not be the total value of the transmission quality deterioration quantities in the spans, but may be, for example, a logarithmic value thereof or the like. Then, the transmission quality deterioration quantities $\Delta Q_{ISBR1}$ to $\Delta Q_{OSNRN}$ (for example, referred to as $\Delta Q_{OSNRX}$) are calculated by $g(\lambda_{exp}, \lambda_{add}, M_{\lambda x}, P_{inx}, FiberType_x)$. Here, $M_{\lambda x}$ denotes the wavelength number of the X-th span of the existing optical path of which the variation will be estimated.

The transmission quality deterioration quantity information due to an OSNR deterioration 303a is an example in which Pin is −2 dBm/ch, the fiber type is an SMF, and $M_\lambda$ is 1. The transmission quality deterioration quantity information due to an OSNR deterioration 303a indicates estimated values of the transmission quality deterioration quantities due to an OSNR deterioration $\Delta Q_{OSNRX}$ corresponding to the wavelength ($\lambda_{exp}$) of the optical path to be calculated in the X-th span and the wavelength ($\lambda_{add}$) of the added optical path. When there is no optical path to be added, there is no influence on the existing optical path and thus, all the transmission quality deterioration quantities $\Delta Q_{OSNRX}$ are 0.

The transmission quality deterioration quantity information due to an OSNR deterioration 303b is an example in which $P_{in}$ is −2 dBm/ch, the fiber type is an SMF, and $M_\lambda$ is 2. The transmission quality deterioration quantity information due to an OSNR deterioration 303b indicates estimated values of the transmission quality deterioration quantities due to an OSNR deterioration $\Delta Q_{OSNRX}$ corresponding to the wavelength ($\lambda_{exp}$) of the optical path to be calculated in the X-th span and the wavelength ($\lambda_{add}$) of the added optical path. When there is no optical path to be added, there is no influence on the existing optical path and thus, all the transmission quality deterioration quantities $\Delta Q_{OSNRX}$ are 0.

The transmission quality deterioration quantity information due to an OSNR deterioration 303c is an example in which Pin is −2 dBm/ch, the fiber type is an SMF, and $M_\lambda$ is 3. The transmission quality deterioration quantity information due to an OSNR deterioration 303c indicates estimated values of the transmission quality deterioration quantities due to an OSNR deterioration $\Delta Q_{OSNRX}$ corresponding to the wavelength ($\lambda_{exp}$) of the optical path to be calculated in the X-th span and the wavelength ($\lambda_{add}$) of the added optical path. When there is no optical path to be added, there is no influence on the existing optical path and thus all the transmission quality deterioration quantities $\Delta Q_{OSNRX}$ are 0.

The transmission quality deterioration quantity information due to an OSNR deterioration 303a to 303c is an example, and is stored in the memory unit 113 for each combination of Pin, the wavelength number of the X-th span ($M_{\lambda x}$), and the fiber type.

Figure 6:
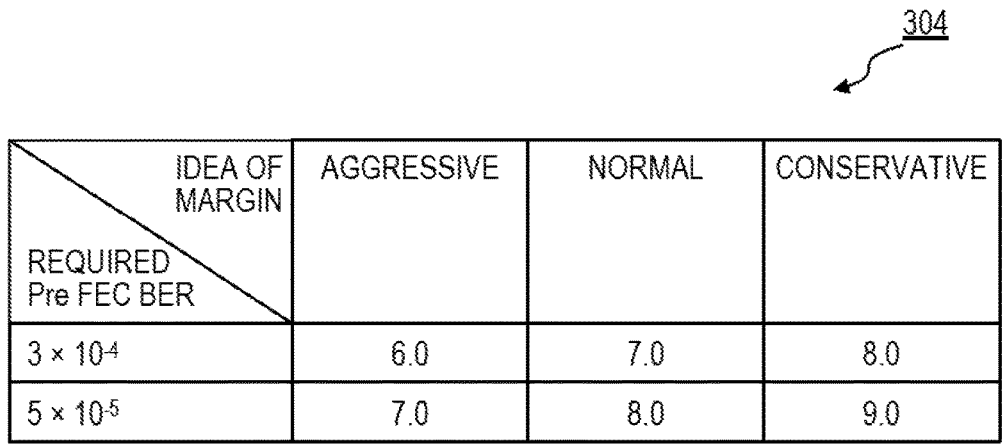
FIG. 6 is a diagram illustrating an example of user policy information according to the embodiment.

FIG. 6 is a diagram illustrating an example of the user policy information according to the present embodiment. The user policy information 304 is information stored in the storage unit 115. The user arbitrarily selects desired transmission quality ($Q_{req}$) when adding an optical path from combinations of the required Pre FEC BER and an idea of a margin. The determination unit 116 determines whether a new optical path is addable using the selected desired transmission quality ($Q_{req}$)

The required Pre FEC BER is a value which is used to improve performance of an error bit rate due to forward error correction of optical communication. The idea of a margin indicates what margin the user wants to set. $Q_{req}$ also depends on optical signal types (the bit error rate and modulation methods), performance of the optical transmitter and receiver, and the like.

Figure 7:
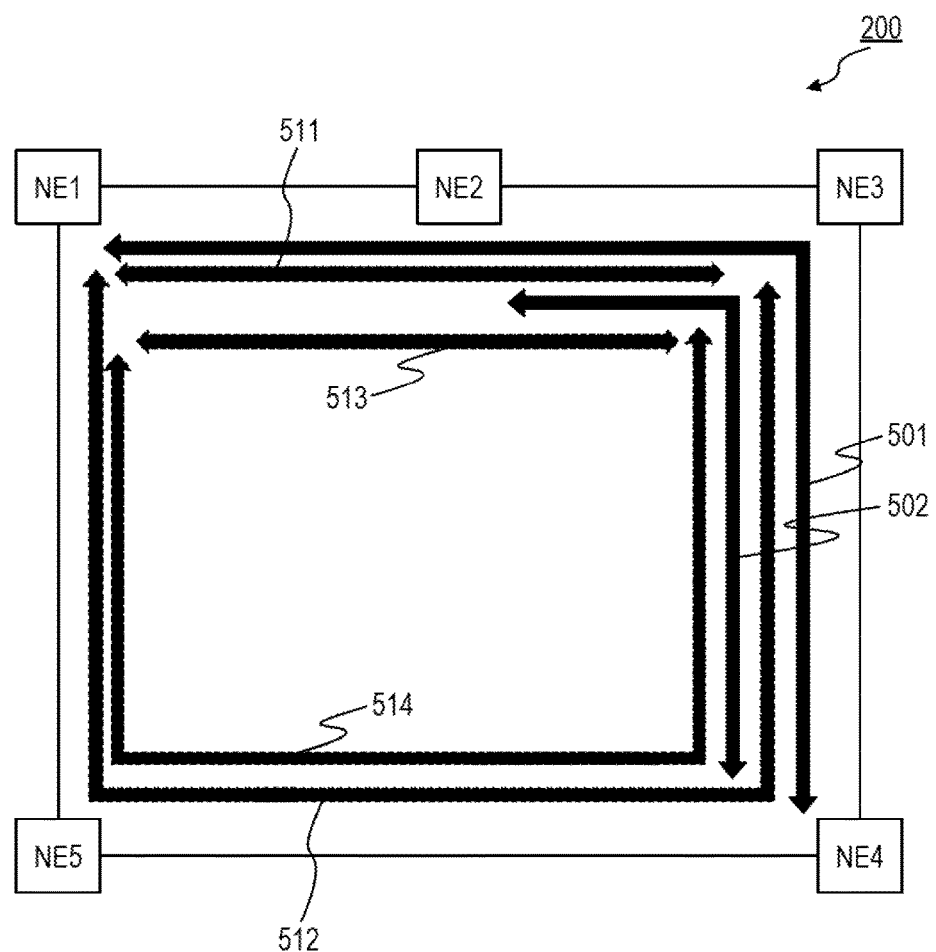
FIG. 7 is a diagram illustrating an example of a method of prioritizing optical paths addable.

FIG. 7 is a diagram illustrating an example of the method of prioritizing optical paths addable. The network 200 is a network including node elements NE1 to NE5. For example, light input from the node element NE1 is transmitted in the ring-shaped network 200 such as NE1~NE2~NE3~NE4~NE5~NE1. The network 200 transmits, for example, light of four different wavelengths of $\lambda\#1$ to $\lambda\#4$. It is assumed that the wavelength becomes shorter in the order of $\lambda\#1$, $\lambda\#2$, $\lambda\#3$, and $\lambda\#4$.

An existing optical path 501 is set up as NE1~NE2~NE3~NE4, and is an optical path with a wavelength $\lambda\#1$. An existing optical path 502 is set up as NE2~NE3~NE4 and is an optical path with a wavelength $\lambda\#3$.

Here, four optical paths including the node element NE1 as a start point and the node element 3 as an end point are added. An added optical path 511 is NE1~NE2~NE3 of which the wavelength is $\lambda\#2$. An added optical path 512 is NE1~NE5~NE4~NE3 of which the wavelength is $\lambda\#2$. An added optical path 513 is NE1~NE2~NE3 of which the wavelength is $\lambda\#4$. An added optical path 514 is NE1~NE5~NE4~NE3 of which the wavelength is $\lambda\#4$.

Then, the determination unit 116 determines whether the added optical paths 511 to 514 are addable (the process (4)). In the process (2), priority orders (an optical path having the smallest number of spans and the shortest wavelength has the highest priority order) may be set on the basis of information of an optical path requested by the user. Then, the priority orders of the added optical paths are given in the order of the added optical path 511, the added optical path 513, the added optical path 512, and the added optical path 514.

[Specific Example of Process (4)]

Optical paths newly added as NE1~NE2~NE3 are the added optical path 511 and the added optical path 513. For example, the process of determining whether the added optical path 511 (in NE1~NE2~NE3 with a wavelength λ#2) (the process (4)) is addable will be specifically described below.

The transmission quality ($Q_{cur}$) of the added optical path 511 (in NE1~NE2~NE3 with a wavelength λ#2) is 9.8 (FIG. 3). An optical path having a possibility of new addition as NE1~NE2~NE3 is NE1~NE2 with a wavelength λ#3 (an extension of the existing optical path 502) or the added optical path 513 in NE1~NE2~NE3 with a wavelength λ#4.

The estimation unit 114 estimates a transmission quality variation when an optical path in NE1~NE2 with a wavelength λ#3 is added later. First, the estimation unit 114 estimates the transmission quality deterioration quantity due to a nonlinear penalty (ΔQ) due to the wavelength X#3 of NE1~NE2. Regarding the transmission quality deterioration quantity ($\Delta Q_{penalty1}$) of λ#3 of NE1~NE2 (the first span), since no previous span is present, the transmission quality deterioration quantity $\Delta Q_{penalty}$ up to the previous span is 0. The estimation unit 114 estimates the transmission quality deterioration quantity ($\Delta Q_{penalty1}$) at the wavelength ($\lambda_{exp}$=λ#2) of the optical path to be calculated and the wavelength ($\lambda_{add}$=λ#3) of the added optical path to be 0.3 on the basis of the transmission quality deterioration quantity information due to a nonlinear penalty 302a. Since the path of NE1~NE2 includes one span, the transmission quality deterioration quantity (ΔQ) is 0.3 which is equal to $\Delta Q_{penalty1}$.

The estimation unit 114 estimates the transmission quality deterioration quantity due to an OSNR deterioration ($\Delta Q_{OSNR}$) due to the wavelength λ#3 of NE1~NE2. The estimation unit 114 estimates that two wavelengths of the existing optical path 501 and the added optical path 511 ($\lambda_{exp}$) are present in NE1~NE2 (the first span), and substitutes 2 into $M_\lambda$. The estimation unit 114 estimates the transmission quality deterioration quantity ($\Delta Q_{OSNR1}$) at the wavelength ($\lambda_{exp}$=λ#2) of the optical path to be calculated and the wavelength ($\lambda_{add}$=λ#3) of the added optical path to be 0.1 on the basis of the transmission quality deterioration quantity information due to an OSNR deterioration 303b ($M_\lambda$=2). Since the path of NE1~NE2 includes one span, the transmission quality deterioration quantity ($\Delta Q_{OSNR}$) is 0.1 which is equal to $\Delta Q_{OSNR1}$.

The estimation unit 114 estimates the transmission quality variation (the sum of $\Delta Q_{penalty}$ and $\Delta Q_{OSNR}$) when an optical path in NE1~NE2 with a wavelength λ#3 is added later to be 0.4.

Next, the estimation unit 114 estimates a transmission quality variation when an optical path in NE1~NE2~NE3 with a wavelength λ#4 is added later. First, the estimation unit 114 estimates the transmission quality deterioration quantity due to a nonlinear penalty ($\Delta Q_{penalty}$) due to in the wavelength λ#4 of NE1~NE2~NE3. Regarding the transmission quality deterioration quantity ($\Delta Q_{penalty1}$) in NE1~NE2 (the first span) with λ#4, since a previous span is not present, the transmission quality deterioration quantity $\Delta Q_{penalty}$ up to the previous span is 0. The estimation unit 114 estimates the transmission quality deterioration quantity ($\Delta Q_{penalty1}$) at the wavelength ($\lambda_{exp}$=λ#2) of the optical path to be calculated and the wavelength ($\lambda_{add}$=λ#4) of the added optical path to be 0.2 on the basis of the transmission quality deterioration quantity information due to a nonlinear penalty 302a.

Regarding the transmission quality deterioration quantity ($\Delta Q_{penalty2}$) in NE2~NE3 (the second span) with λ#4, the transmission quality deterioration quantity $\Delta Q_{penalty1}$ up to the previous span is 0.2. The estimation unit 114 estimates the transmission quality deterioration quantity ($\Delta Q_{penalty2}$) at the wavelength ($\lambda_{exp}$=λ#2) of the optical path to be calculated and the wavelength ($\lambda_{add}$=λ#4) of the added optical path to be 0.4 on the basis of the transmission quality deterioration quantity information due to a nonlinear penalty 302b. The transmission quality deterioration quantity due to a nonlinear penalty ($\Delta Q_{penalty}$) is 0.4 which is equal to $\Delta Q_{penalty2}$.

The estimation unit 114 estimates the transmission quality deterioration quantity due to an OSNR deterioration ($\Delta Q_{OSNR}$) due to the wavelength λ#4 of NE1~NE2~NE3. The estimation unit 114 estimates that three wavelengths of the existing optical path 501, the added optical path 511 ($\lambda_{exp}$), and the wavelength λ#3 (an extension of the existing optical path 502) are present in NE1~NE2 (the first span), and substitutes 3 into $M_\lambda$. The estimation unit 114 estimates the transmission quality deterioration quantity ($\Delta Q_{OSNR1}$) at the wavelength ($\lambda_{exp}$=λ#2) of the optical path to be calculated and the wavelength (λ=λ#4) of the added optical path to be 0.2 on the basis of the transmission quality deterioration quantity information due to an OSNR deterioration 303c ($M_\lambda$=3).

The estimation unit 114 estimates that three wavelengths of the existing optical path 501, the added optical path 511 ($\lambda_{exp}$), and the wavelength λ#3 (an extension of the existing optical path 502) are present in NE2~NE3 (the second span), and substitutes 3 into $M_\lambda$. The estimation unit 114 estimates the transmission quality deterioration quantity ($\Delta Q_{OSNR2}$) at the wavelength ($\lambda_{exp}$=X#2) of the optical path to be calculated and the wavelength ($\lambda_{add}$=λ#4) of the added optical path to be 0.2 on the basis of the transmission quality deterioration quantity information due to an OSNR deterioration 303c ($M_\lambda$=3). The transmission quality deterioration quantity due to an OSNR deterioration ($\Delta Q_{OSNR}$) is 0.4 which is equal to the sum of $\Delta Q_{OSNR1}$ and $\Delta Q_{OSNR2}$.

Accordingly, the estimation unit 114 estimates the transmission quality variation (the sum of $\Delta Q_{penalty}$ and $\Delta Q_{OSNR}$) when an optical path in NE1~NE2~NE3 with a wavelength λ#4 is added later to be 0.8. The estimation unit 114 estimates that the transmission quality deterioration quantities ($Q_{add}$) due to the addition of the optical path in NE1~NE2 with a wavelength λ#3 and the added optical path in NE1~NE2~NE3 with a wavelength λ#4 is 1.2 which is equal to the sum of 0.4 and 0.8.

Here, when it is assumed that the user selects the required Pre FEC BER (3×10−4) and the idea of a margin (normal) of the user policy, the desired transmission quality ($Q_{req}$) is 7.0.

The deteriorated transmission quality of the added optical path 511 (in NE1~NE2~NE3 with a wavelength λ#2) is 8.6. Since the desired transmission quality ($Q_{req}$) satisfies 7.0, the determination unit 116 determines that the added optical path 511 is addable.

[Specific Example of Process (6)]

The estimation unit 114 estimates an influence on an existing optical path when the added optical path 511 (in NE1~NE2~NE3 with a wavelength λ#2) is added (the process (6)). The existing optical paths overlapping with the added optical path 511 in one or more spans include two existing optical paths of the existing optical path 501 and the existing optical path 502.

First, the estimation unit 113 estimates an influence on the existing optical path 501 (in NE1~NE2~NE3~NE4 with a wavelength λ#1). The transmission quality ($Q_{cur}$) of the existing optical path 501 (the optical path in NE1~NE2~NE3~NE4 with a wavelength λ#1) is 7.9 (FIG. 3).

The estimation unit 114 estimates the transmission quality variation of the existing optical path 501 (in NE1~NE2~NE3~NE4 with a wavelength X#1) when the added optical path 511 (in NE1~NE2~NE3 with a wavelength X#2) is added later. First, the estimation unit 114 estimates the transmission quality deterioration quantity due to a nonlinear penalty ($\Delta Q_{penalty}$) due to the existing optical path 501 (in NE1~NE2~NE3~NE4 with a wavelength λ#1). Regarding the transmission quality deterioration quantity ($\Delta Q_{penalty1}$) in NE1~NE2 (the first span) with λ#1, since a previous span is not present, the transmission quality deterioration quantity $\Delta Q_{penalty}$ up to the previous span is 0.

The estimation unit 114 estimates the transmission quality deterioration quantity ($\Delta Q_{penalty1}$) at the wavelength ($\lambda_{exp}$=λ#1) of the optical path to be calculated and the wavelength ($\lambda_{add}$=λ#2) of the added optical path to be 0.3 on the basis of the transmission quality deterioration quantity information due to a nonlinear penalty 302a.

In the transmission quality deterioration quantity ($\Delta Q_{penalty2}$) in NE2~NE3 (the second span) with λ#1, the transmission quality deterioration quantity $\Delta Q_{penalty1}$ up to the previous span is 0.3. The estimation unit 114 estimates the transmission quality deterioration quantity ($\Delta Q_{penalty2}$) at the wavelength ($\lambda_{exp}$=λ#1) of the optical path to be calculated and the wavelength ($\lambda_{add}$=λ#2) of the added optical path to be 0.6 on the basis of the transmission quality deterioration quantity information due to a nonlinear penalty 302c.

Since two spans overlap with each other, the transmission quality deterioration quantity due to a nonlinear penalty ($\Delta Q_{penalty}$) is 0.6 which is equal to $\Delta Q_{penalty2}$.

The estimation unit 114 estimates the transmission quality deterioration quantity due to an OSNR deterioration ($\Delta Q_{OSNR}$) due to the wavelength λ#1 of NE1~NE2~NE3. The estimation unit 114 estimates that one wavelength of the existing optical path 501 is present in NE1~NE2 (the first span), and substitutes 1 into $M_\lambda$. The estimation unit 114 estimates the transmission quality deterioration quantity ($\Delta Q_{OSNR1}$) at the wavelength ($\lambda_{exp}$=λ#1) of the optical path to be calculated and the wavelength ($\lambda_{add}$=λ#2) of the added optical path to be 0.1 on the basis of the transmission quality deterioration quantity information due to an OSNR deterioration 303a ($M_\lambda$=1).

Because two wavelengths of the existing optical path 501 (λ#1) and the existing optical path 502 (λ#3) are present in NE2 to NE3 (the second span), the estimation unit 114 substitutes 2 into $M_\lambda$. The estimation unit 114 estimates the transmission quality deterioration quantity ($\Delta Q_{OSNR2}$) at the wavelength ($\lambda_{exp}$=λ#1) of the optical path to be calculated and the wavelength ($\lambda_{add}$=λ#2) of the added optical path to be 0.1 on the basis of the transmission quality deterioration quantity information due to an OSNR deterioration 303b ($M_\lambda$=2). The transmission quality deterioration quantity due to an OSNR deterioration ($\Delta Q_{OSNR}$) is 0.2 which is equal to the sum of $\Delta Q_{OSNR1}$ and $\Delta Q_{OSNR2}$.

Accordingly, the estimation unit 114 estimates the transmission quality variation ($Q_{add}$ (the sum of $\Delta Q_{penalty}$ and $\Delta Q_{OSNR}$) of the existing optical path 501 when the added optical path 511 is added later to be 0.8.

Here, when it is assumed that the user selects the required Pre FEC BER (3×10−4) and the idea of a margin (normal) of the user policy, the desired transmission quality ($Q_{req}$) is 7.0.

The deteriorated transmission quality of the existing optical path 501 (in NE1~NE2~NE3 with a wavelength λ#1) is 7.1. Since the desired transmission quality ($Q_{req}$) satisfies 7.0, the determination unit 116 determines that there is no adverse influence on the existing optical path 501.

In addition, the estimation unit 114 estimates an influence on the existing optical path 502 (in NE2~NE3~NE4 with a wavelength λ#3). The transmission quality ($Q_{cur}$) of the existing optical path 502 (in NE2~NE3~NE4 with a wavelength λ#3) is 9.9 (FIG. 3).

The estimation unit 114 estimates the transmission quality variation of the existing optical path 502 (in NE2~NE3~NE4 with a wavelength λ#3) when the added optical path 511 (in NE1~NE2~NE3 with a wavelength λ#2) is added later. The estimation unit 114 estimates the transmission quality deterioration quantity due to a nonlinear penalty ($\Delta Q_{penalty}$) due to the existing optical path 502 (in NE2~NE3~NE4 with a wavelength λ#3). Regarding the transmission quality deterioration quantity ($\Delta Q_{penalty1}$) in NE2~NE3 (the first span) with λ#3, since a previous span is not present, the transmission quality deterioration quantity $\Delta Q_{penalty}$ up to the previous span is 0. The estimation unit 114 estimates the transmission quality deterioration quantity ($\Delta Q_{penalty1}$) at the wavelength ($\lambda_{exp}$=λ#3) of the optical path to be calculated and the wavelength ($\lambda_{add}$=λ#2) of the added optical path to be 0.3 on the basis of the transmission quality deterioration quantity information due to a nonlinear penalty 302a.

Since the number of overlapping spans is one, the transmission quality deterioration quantity due to a nonlinear penalty ($\Delta Q_{penalty}$) is 0.3 which is equal to $\Delta Q_{penalty1}$.

The estimation unit 114 estimates the transmission quality deterioration quantity due to an OSNR deterioration ($\Delta Q_{OSNR}$) due to the wavelength λ#3 of NE2~NE3~NE4. The estimation unit 114 estimates that two wavelengths of the existing optical path 501 are present in NE2~NE3 (the first span), and substitutes 2 into $M_\lambda$. The estimation unit 114 estimates the transmission quality deterioration quantity ($\Delta Q_{OSNR1}$) at the wavelength ($\lambda_{exp}$=λ#3) of the optical path to be calculated and the wavelength ($\lambda_{add}$=λ#2) of the added optical path to be 0.0 on the basis of the transmission quality deterioration quantity information due to an OSNR deterioration 303c ($M_\lambda$=2).

Since the number of overlapping spans is one, the transmission quality deterioration quantity due to an OSNR deterioration ($\Delta Q_{OSNR}$) is 0.0 which is equal to $\Delta Q_{OSRN1}$.

Accordingly, the estimation unit 114 estimates the transmission quality variation ($Q_{add}$ (the sum of $\Delta Q_{penalty}$ and $\Delta Q_{OSNR}$) of the existing optical path 502 when the added optical path 511 is added later to be 0.3.

Here, when it is assumed that the user selects the required Pre FEC BER (3×10−4) and the idea of a margin (normal) of the user policy, the desired transmission quality ($Q_{req}$) is 7.0.

The deteriorated transmission quality of the existing optical path 502 is 9.6. Since the desired transmission quality ($Q_{req}$) satisfies 7.0, the determination unit 116 determines that there is no adverse influence on the existing optical path 502.

Since the addition of the added optical path 511 does not have an adverse influence on any of the existing optical path 501 and the existing optical path 502, the determination unit 116 determines that the added optical path 511 is addable.

FIG. 8 is a diagram illustrating an example of updated transmission quality information. The updated transmission quality information 601 is an example obtained after updating the transmission quality information 301 of FIG. 3 after λ#2 of NE1~NE2~NE3 has been actually added to the network 200. When λ#2 of NE1~NE2~NE3 is actually added to the network 200, the measuring unit 124 measures the latest transmission quality and transmits the measurement result to the network management device 110. The memory unit 113 updates the transmission quality information on the basis of the actual measurement result. Then, the memory unit 113 stores a value of the transmission quality at λ#1 which is updated from 7.9 to 7.7 in the section of NE1~NE2~NE3~NE4. The memory unit 113 stores a value of the transmission quality at λ#2 which is updated from 9.8 to 9.2 in the section of NE1~NE2~NE3. The memory unit 113 stores a value of the transmission quality at λ#3 which is updated from 9.9 to 9.8 in the section of NE2~NE3~NE4.

Here, there occurs a case in which the actual measurement result is different from the estimation result of the estimation unit 114. Since the actual measurement result and the estimation result are different from each other, the estimation unit 114 updates the transmission quality deterioration quantity information due to a nonlinear penalty 302a to 302c and the transmission quality deterioration quantity information due to an OSNR deterioration 303a to 303c.

Figure 9B:
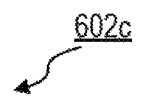
FIG. 9B is a diagram illustrating an example of updated transmission quality deterioration quantity information due to a nonlinear penalty.

FIGS. 9A and 9B are diagrams illustrating an example of updated transmission quality deterioration quantity information due to a nonlinear penalty. Transmission quality deterioration quantity information 602a is an example of the updated transmission quality deterioration quantity information 302a. Transmission quality deterioration quantity information 602b is an example of the updated transmission quality deterioration quantity information 302b. Transmission quality deterioration quantity information 602c is an example of the updated transmission quality deterioration quantity information 302c.

The estimation unit 114 calculates the transmission quality deterioration quantity on the basis of the actual measurement result, the estimation result, the values set in the transmission quality deterioration quantity information, and the like. Specifically, the estimation unit 114 calculates the transmission quality deterioration quantity using the following equation: (non-updated transmission quality deterioration quantity)×((non-updated transmission quality)−(estimation result))÷((non-updated transmission quality)−(actual measurement result)).

In the transmission quality deterioration quantity information 602a, sets of $\lambda_{add}$=λ#2 and $\lambda_{exp}$=λ#1, λadd=λ#2 and $\lambda_{exp}$=$\lambda_{add}$=λ#3 and $\lambda_{exp}$=λ#2, and $\lambda_{add}$=λ#4 and $\lambda_{exp}$=λ#2 are updated based on the value calculated by the estimation unit 114 in the above-described processes (4) and (6). With respect to these sets, the estimation unit 114 sets a value proportional by (9.9−9.8)÷(9.9−9.6) times to the transmission quality deterioration quantity information 302a on the basis of the value calculated by the estimation unit 114 in the processes (4) and (6). The transmission quality deterioration quantity information 602a is updated in places which are used for the above-mentioned calculation, but may be updated in other places in the same way.

In the transmission quality deterioration quantity information 602b, a set of $\lambda_{add}$=λ#4 and $\lambda_{exp}$=λ#2 is updated based on the value calculated by the estimation unit 114 in the processes (4) and (6). With respect to this set, the estimation unit 114 sets a value proportional by (9.8−9.2)÷ (9.8−8.6) times to the transmission quality deterioration quantity information 302b on the basis of the value calculated by the estimation unit 114 in the processes (4) and (6). The transmission quality deterioration quantity information 602b is updated in places which are used in the above-mentioned calculation, but may be updated in other places in the same way.

In the transmission quality deterioration quantity information 602c a set of $\lambda_{add}$=λ#2 and $\lambda_{exp}$=λ#1 is updated based on the value calculated by the estimation unit 114 in the processes (4) and (6). With respect to this set, the estimation unit 114 sets a value proportional by (7.9−7.7)÷ (7.9−7.1) times to the transmission quality deterioration quantity information 302c on the basis of the value calculated by the estimation unit 114 in the processes (4) and (6). The transmission quality deterioration quantity information 602c is updated in places which are used in the above-mentioned calculation, but may be updated in other places in the same way.

Figure 10B:
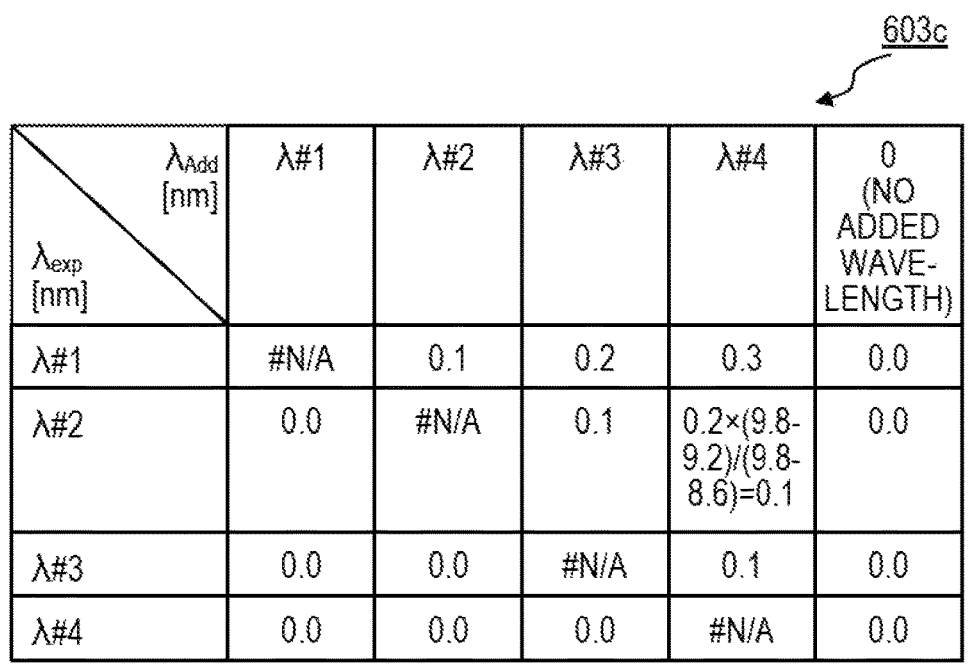
FIG. 10B is a diagram illustrating an example of updated transmission quality deterioration quantity information due to an OSNR deterioration.

FIGS. 10A and 10B are diagrams illustrating an example of updated transmission quality deterioration quantity information due to an OSNR deterioration. Transmission quality deterioration quantity information 603a is an example of the updated transmission quality deterioration quantity information 303a. Transmission quality deterioration quantity information 603b is an example of the updated transmission quality deterioration quantity information 303b. Transmission quality deterioration quantity information 603c is an example of the updated transmission quality deterioration quantity information 303c.

The estimation unit 114 calculates the transmission quality deterioration quantity on the basis of the actual measurement result, the estimation result, the values set in the transmission quality deterioration quantity information, and the like. Specifically, the estimation unit 114 calculates the transmission quality deterioration quantity by the following equation: (non-updated transmission quality deterioration quantity)×((non-updated transmission quality)−(estimation result))÷((non-updated transmission quality)−(actual measurement result)).

In the transmission quality deterioration quantity information 603a a set of $\lambda_{add}$=λ#2 and $\lambda_{exp}$=λ#1 is updated based on the value calculated by the estimation unit 114 in the processes (4) and (6). With respect to this set, the estimation unit 114 sets a value proportional by (7.9−7.7)÷ (7.9−7.1) times to the transmission quality deterioration quantity information 303a on the basis of the value calculated by the estimation unit 114 in the processes (4) and (6). The transmission quality deterioration quantity information 603a is updated in places which are used in the above-mentioned calculation, but may be updated in other places in the same way.

In the transmission quality deterioration quantity information 603b sets of $\lambda_{add}$=λ#2 and $\lambda_{exp}$=λ#1, $\lambda_{add}$=λ#2 and $\lambda_{exp}$=λ#3, and $\lambda_{add}$=λ#3 and $X_{exp}$=λ#2 are updated based on the value calculated by the estimation unit 114 in the processes (4) and (6). With respect to the set of $\lambda_{add}$=λ#2 and $\lambda_{exp}$=λ#1, the estimation unit 114 sets a value proportional by (7.9−7.7)÷(7.9−7.1) times to the transmission quality deterioration quantity information 303b for on the basis of the value calculated by the estimation unit 114 in the processes (4) and (6). With respect to the set of $\lambda_{add}$=λ#2 and $\lambda_{exp}$=λ#3, the estimation unit 114 sets a value proportional by (9.8−9.2)÷(9.8−8.6) times to the transmission quality deterioration quantity information 303b on the basis of the value calculated by the estimation unit 114 in the processes (4) and (6). With respect to the set of $\lambda_{add}$=λ#3 and $\lambda_{exp}=\lambda\#2$ the estimation unit 114 sets a value proportional by $(9.9-9.8) \div (9.9-9.6)$ times to the transmission quality deterioration quantity information 303b on the basis of the value calculated by the estimation unit 114 in the processes (4) and (6). The transmission quality deterioration quantity information 603b is updated in places which are used in the above-mentioned calculation, but may be updated in other places in the same way.

In the transmission quality deterioration quantity information 603c, a set of $\lambda_{add}=\lambda\#4$ and $\lambda_{exp}=\lambda\#2$ is updated based on the value calculated by the estimation unit 114 in the processes (4) and (6). With respect to this set, the estimation unit 114 sets a value proportional by $(9.8-9.2) \div (9.8-8.6)$ times to the transmission quality deterioration quantity information 303c on the basis of the value calculated by the estimation unit 114 in the processes (4) and (6). The transmission quality deterioration quantity information 603c is updated in places which are used in the above-mentioned calculation, but may be updated in other places in the same way.

Figure 11:
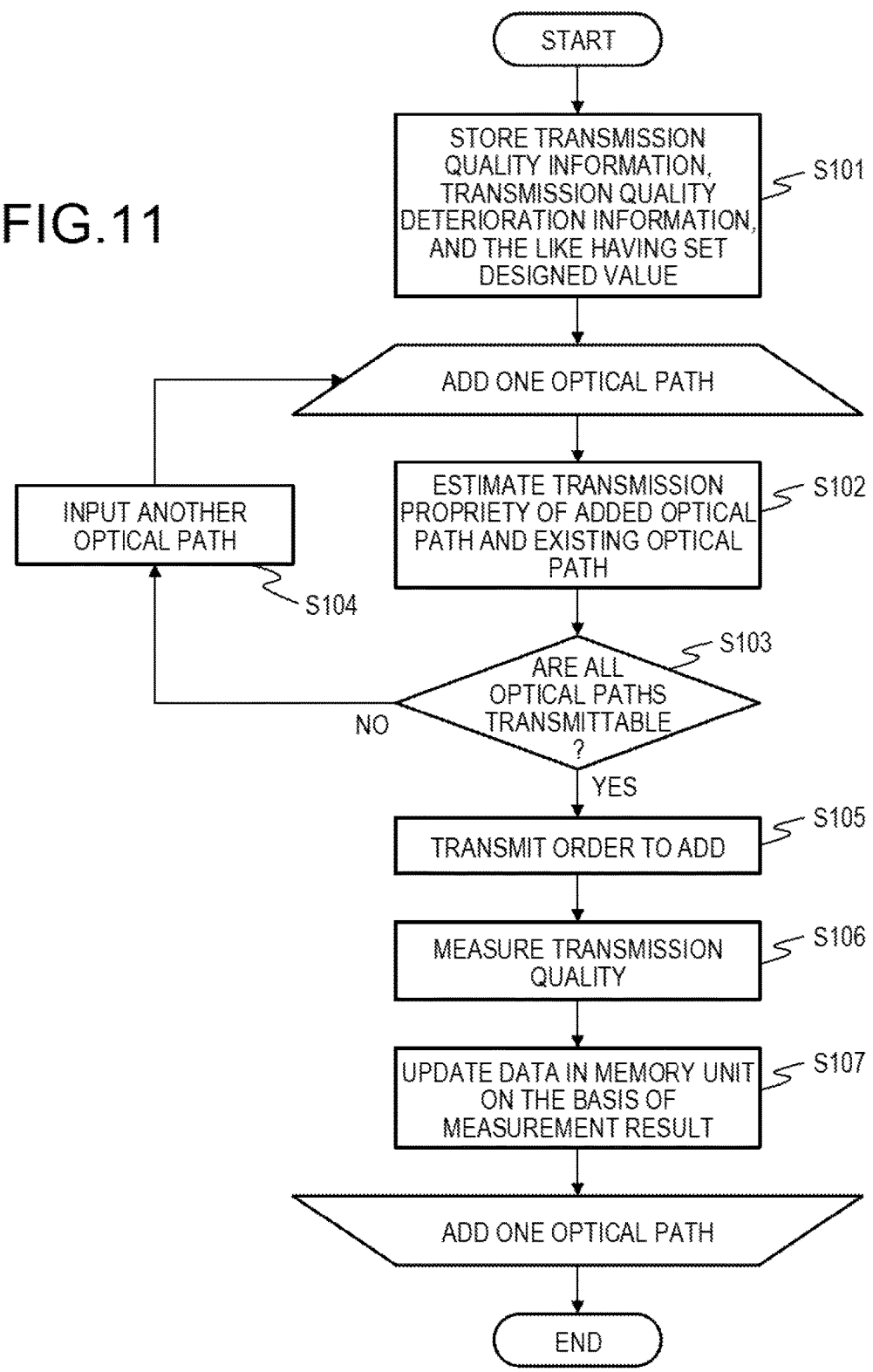
FIG. 11 is a flowchart illustrating an example of a process flow in a network management system according to the embodiment.

FIG. 11 is a flowchart illustrating an example of a process flow in the network management system according to the present embodiment. In FIG. 11, it is assumed that there is no optical path in the WDM network 120. The memory unit 113 stores the transmission quality information, the transmission quality deterioration quantity information due to a nonlinear penalty, and the transmission quality deterioration quantity information due to an OSNR deterioration in which design values are set (operation S101).

As a process in the case of adding one optical path, the second receiver 112 receives a request for adding one optical path. The estimation unit 114 and the determination unit 115 estimate whether an optical path (one path) to be added and an existing optical path (operation S102) are transmittable. The estimation unit 114 determines whether both the optical path to be added (one path) and the existing optical path are transmittable (operation S103).

In the case where both the optical path to be added (one path) and the existing optical path are not transmittable (NO in operation S103), the second receiver 112 receives a request for adding another optical path from the user (operation S104). When the request for adding another optical path is received from the user in operation S104, the process is repeated from operation S102.

In the case where both the optical path to be added (one path) and the existing optical path are transmittable (YES in operation S103), the order unit 117 transmits an order to add an optical path and an order to measure transmission quality to the node elements NE in the WDM network 120 (operation S105). The measuring unit 124 of the optical receiver 123 measures the transmission quality after a new optical path is added (operation S106). The first receiver 111 receives the measurement result (operation S106). The memory unit 113 stores the transmission quality information, the transmission quality deterioration quantity information due to a nonlinear penalty, and the transmission quality deterioration quantity information due to an OSNR deterioration which are updated on the basis of the measurement result (operation S107). The process is repeated from operation S102 until operations S102 to S107 are completed for all the optical paths input by the user. When operations S102 to S107 are completed for all the optical paths input by the user, the network management device ends the process flow.

Figure 12:
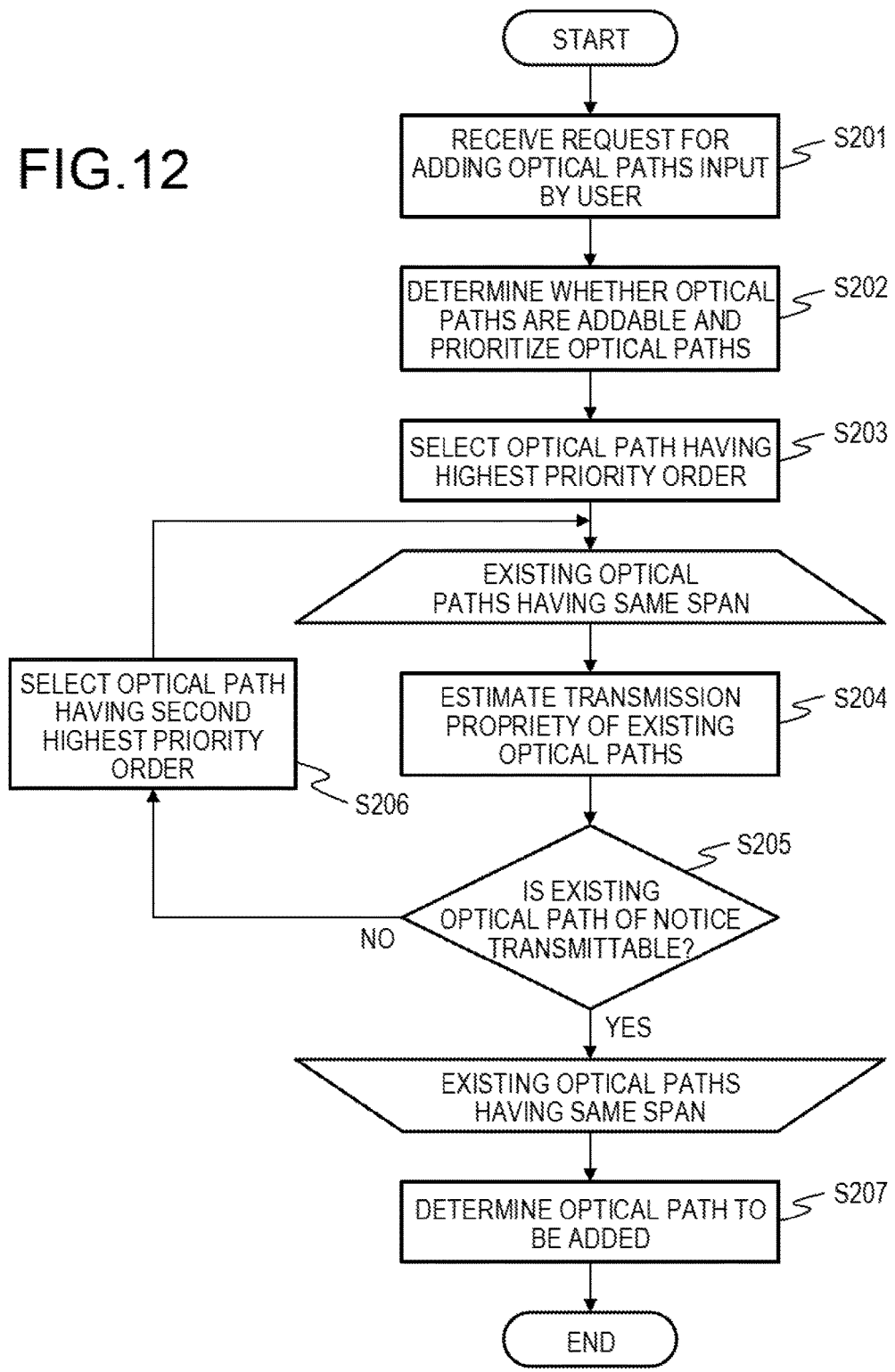
FIG. 12 is a flowchart illustrating an example of a process flow of determining whether an optical path is addable.

FIG. 12 is a flowchart illustrating an example of a process of determining whether an optical path is addable. The process of determining whether an optical path is addable illustrated in FIG. 12 is a process for describing operation S102 in FIG. 11 in more detail.

The second receiver 112 receives a request for adding one optical path (operation S201). The determination unit 116 determines whether the requested optical path is addable using the estimation result of the estimation unit 114 and extracts an addable optical path. When there are plural addable optical paths, the determination unit 116 prioritizes the optical paths (operation S202). The determination unit 116 selects one optical path having a high priority order (operation S203).

Based on one existing optical path including the same span as the selected optical path, the determination unit 116 determines whether the selected optical path has an adverse influence on the existing optical path and estimates transmission propriety thereof (operation S204). The determination unit 116 determines whether the based existing optical path is transmittable (operation S205).

When it is determined that the based existing optical path is not transmittable (NO in operation S205), the determination unit 116 selects an optical path addable having the second highest priority order (operation S206). The determination unit 116 repeats the process from operation S204 on the optical path selected in operation S206.

When it is determined that the based existing optical path is transmittable (YES in operation S205) and there is an existing optical path having the same span as the selected optical path, the determination unit 116 repeats the process from operation S204. When it is determined that the existing optical path of interest is transmittable (YES in operation S205) and there is no existing optical path having the same span as the selected optical path, the determination unit 116 determines an optical path to be added (operation S207). Specifically, the determination unit 116 determines the optical path determined to be addable (operation S202) and not to interfere with the transmission of the existing optical path as an optical path to be added. When the process of operation S207 is ended, the determination unit 116 ends the process of operation S102 in FIG. 11.

In this way, the estimation unit 114 may estimate an adverse influence on an existing optical path on the basis of the measured value. The determination unit 116 determines whether there is no adverse influence on an existing optical path and whether desired transmission quality is to be ensured on the basis of the estimation result of the estimation unit 114 for each new optical path. Accordingly, a network design based on actual operation may be made more efficiently than a network design using a design value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A network management device configured to manage a network on which an existing optical path is operated, the network management device comprising:

a first receiver configured to receive data related to a measurement result of signal quality of a first optical signal having a first wavelength on the existing optical path;
a second receiver configured to receive a request for adding a second optical signal having a second wavelength to the existing optical path;
at least one memory configured to store a procedure; and
at least one processor configured to execute the procedure of
  estimating a transmission quality deterioration quantity in the signal quality of the first optical signal due to a non-linear penalty deterioration and an optical signal to noise ratio (OSNR) deterioration when the second optical signal is added to the existing optical path based on the data related to the measurement result of the signal quality of the first optical signal, when the request for adding the second optical signal to the existing optical path is received, and
  subtracting the transmission quality deterioration quantity estimated by the estimating from a current signal quality of the first optical signal thereby determining to add the second optical signal to the existing path when a value from the subtracting is larger than a predetermined value, and determining not to add the second optical signal to the existing path when the value from the subtracting is smaller than the predetermined value.

2. The network management device according to claim 1, wherein the at least one memory stores the data related to the measurement result of the signal quality of the first optical signal when the second optical signal is added to the existing optical path.

3. A network management system comprising:
a measuring device configured to measure signal quality of a first optical signal having a first wavelength on an existing optical path operated on a network; and
a network management device including:
  a first receiver configured to receive data related to a measurement result of the signal quality of the first optical signal measured by the measuring device,
  a second receiver configured to receive a request for adding a second optical signal having a second wavelength to the existing optical path,
  at least one memory configured to store a procedure, and
  at least one processor configured to execute the procedure of
    estimating a transmission quality deterioration quantity in the signal quality of the first optical signal due to a non-linear penalty deterioration and an optical siqnal to noise ratio (OSNR) deterioration when the second optical signal is added to the existing optical path based on the data related to the measurement result of the signal quality of the first optical signal, when the request for adding the second optical signal to the existing optical path is received,
    subtracting the transmission quality deterioration quantity estimated by the estimating from a current signal quality of the first optical signal thereby determining to add the second optical signal to the existing path when a value from the subtracting is larger than a predetermined value, and determining not to add the second optical signal to the existing path when the value from the subtracting is smaller than the predetermined value, and
    transmitting, to the network, an order to add the second optical signal to the existing optical path based on results of the determining.

4. The network management system according to claim 3, wherein the at least one memory stores the data related to the measurement result of the signal quality of the first optical signal when the second optical signal is added to the existing optical path.

5. The network management device according to claim 1, wherein the predetermined value is a required signal quality of the first optical signal when the second optical signal is added to the existing optical path.

6. The network management system according to claim 3, wherein the predetermined value is a required signal quality of the first optical signal when the second optical signal is added to the existing optical path.

* * * * *